(12) United States Patent
Honda et al.

(10) Patent No.: US 11,965,468 B2
(45) Date of Patent: Apr. 23, 2024

(54) VEHICLE CONTROL SYSTEM, VEHICLE CONTROL METHOD, AND STORAGE MEDIUM

(71) Applicant: TOYOTA JIDOSHA KABUSHIKI KAISHA, Toyota (JP)

(72) Inventors: Shinnosuke Honda, Nisshin (JP); Yoshinori Fujitake, Toyota (JP); Suguru Kumazawa, Nisshin (JP); Motohiko Taniyama, Nisshin (JP); Keita Sato, Toyota (JP); Yuki Iizawa, Nisshin (JP); Yoshiyuki Shogenji, Toyota (JP); Yasutaka Tsuchida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/366,228

(22) Filed: Aug. 7, 2023

(65) Prior Publication Data
US 2024/0052794 A1 Feb. 15, 2024

(30) Foreign Application Priority Data
Aug. 9, 2022 (JP) .................. 2022-127057

(51) Int. Cl.
*F02D 17/02* (2006.01)
*F02D 41/00* (2006.01)
*F02D 41/26* (2006.01)

(52) U.S. Cl.
CPC ........... *F02D 17/02* (2013.01); *F02D 41/008* (2013.01); *F02D 41/26* (2013.01)

(58) Field of Classification Search
CPC ......... F02D 17/02; F02D 41/008; F02D 41/26
USPC ......................................................... 701/103
See application file for complete search history.

(56) References Cited

U.S. PATENT DOCUMENTS

| 2017/0356370 A1* | 12/2017 | Doering .................. F02D 17/02 |
| 2021/0107452 A1 | 4/2021 | Nose et al. |
| 2022/0080951 A1 | 3/2022 | Nose et al. |
| 2023/0011834 A1 | 1/2023 | Fujitake et al. |

FOREIGN PATENT DOCUMENTS

| JP | 2021-060027 A | 4/2021 | |
| JP | 2023-011155 A | 1/2023 | |
| WO | WO-2017127219 A1 * | 7/2017 | ............. F02D 13/06 |

* cited by examiner

*Primary Examiner* — Mahmoud Gimie
(74) *Attorney, Agent, or Firm* — Finnegan, Henderson, Farabow, Garrett & Dunner, LLP

(57) ABSTRACT

A vehicle control system, a vehicle control method, and a storage medium are provided. A stopping process stops fuel supply to one or more stopping cylinders and supplies fuel to one or more remaining cylinders during a load operation of an engine. During execution of the stopping process, a compensating process compensates for a decrease in output of the one or more stopping cylinders due to the execution of the stopping process by increasing output generated by combustion in the one or more remaining cylinders. The system control circuit causes, when the engine rotation speed of the engine is the same, the output after being increased by the compensating process to decrease as a shaft torque of the crankshaft of the engine increases.

7 Claims, 6 Drawing Sheets

VEHICLE CONTROL SYSTEM, VEHICLE CONTROL METHOD, AND STORAGE MEDIUM

BACKGROUND

1. Field

The present disclosure relates to a vehicle control system, a vehicle control method, and a storage medium.

2. Description of Related Art

Japanese Laid-Open Patent Publication No. 2021-60027 discloses a vehicle equipped with an engine including multiple cylinders. The vehicle is provided with an exhaust purification device that purifies exhaust gas discharged from the cylinders. The catalyst in the exhaust purification device performs the exhaust purification function at the activation temperature. Therefore, when the temperature of the catalyst is low, the vehicle control system performs catalyst warm-up for warming up the catalyst to the activation temperature.

The control system disclosed in the above document executes a stopping process when it is necessary to increase the temperature of the catalyst. The stopping process stops fuel supply to some of the cylinders of the engine, while supplying fuel to the remaining cylinders. As a result, oxygen is supplied to the exhaust purification device through the stopping cylinder, to which fuel supply is stopped. Since this promotes the oxidation reaction in the catalyst, the temperature of the catalyst increases. In this manner, the control system increases the temperature of the catalyst by executing oxygen supply through the stopping process.

When the stopping process is executed, the fuel supply is stopped in the stopping cylinder, so that the output becomes insufficient. Therefore, the above document discloses that the output shortage is compensated for by combustion in the cylinders other than the stopping cylinder.

Specifically, the output shortage is compensated for by increasing the intake air amount and increasing the fuel supply amount to the cylinders other than the stopping cylinder.

SUMMARY

In one general aspect, a vehicle control system includes a system control circuit. The system control circuit is configured to execute a stopping process for an engine mounted on a vehicle and a compensating process. The engine includes cylinders that include one or more stopping cylinders and one or more remaining cylinders. The stopping process stops fuel supply to the one or more stopping cylinders while supplying fuel to the one or more remaining cylinders during a load operation of the engine. During execution of the stopping process, the compensating process compensates for a decrease in output of the one or more stopping cylinders due to the execution of the stopping process by increasing output generated by combustion in the one or more remaining cylinders. The system control circuit is configured to cause, when the engine rotation speed of the engine is the same, the output after being increased by the compensating process to decrease as a shaft torque of a crankshaft of the engine increases.

The magnitude of the output reduction due to the execution of the stopping process, that is, the magnitude of the output shortage that needs to be compensated for, varies depending on the engine rotation speed and the shaft torque. When the engine rotation speed is the same, the magnitude of the output shortage to be compensated for decreases as the shaft torque increases.

The above-described configuration is capable of dealing with such a tendency. That is, as the shaft torque increases, the amount of increase in the output by the compensating process is reduced. Therefore, the magnitude of the output to be increased by the compensating process is changed in accordance with a change in the magnitude of the output shortage to be compensated for. This allows the output shortage to be compensated for appropriately.

The output that is increased by increasing the amount of fuel supplied to the cylinders other than the stopping cylinder, that is, to the remaining cylinders, may change due to the influence of pumping loss and friction loss. The magnitudes of the pumping loss and the friction loss vary depending on the operating state of the engine at the time. Therefore, even if the fuel supply amount for the remaining cylinders is simply determined in accordance with the number of the stopping cylinders, the output shortage may not be appropriately compensated for. The above-described configuration reduces such a risk.

Another aspect of the present disclosure provides a vehicle control method that executes processes similar to the respective processes of the vehicle control system.

A further aspect of the present disclosure provides a non-transitory computer readable medium that stores a program that causes a processor to execute control processes similar to the respective processes of the above-described vehicle control system.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, a vehicle control system, a vehicle control method, a vehicle control process, and a storage medium according to one embodiment of the present disclosure will now be described with reference to FIGS. 1 to 9.

<Configuration of Hybrid System>

Figure 1:
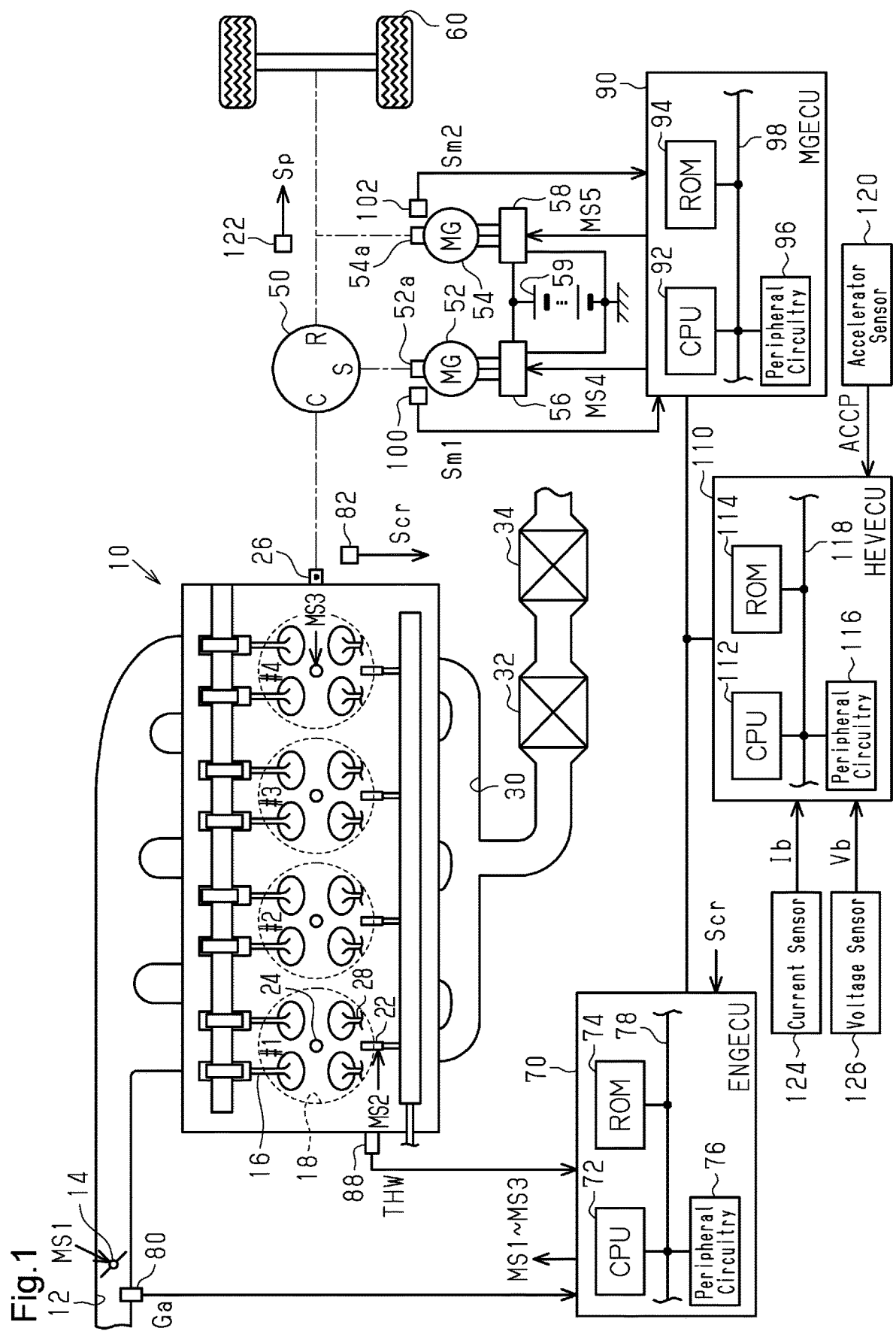
FIG. 1 is a schematic diagram illustrating a configuration of a vehicle control system of the present disclosure and a drive system of the vehicle.

As shown in FIG. 1, the hybrid system in the hybrid electric vehicle includes an engine 10, a first motor-generator 52, and a second motor-generator 54 as drive sources. The engine 10 includes four cylinders #1 to #4. An intake passage 12 of the engine 10 incorporates a throttle valve 14. Air drawn into the intake passage 12 flows into combustion chambers 18 when intake valves 16 are opened. Direct injection valves 22 inject fuel into the respective combustion chambers 18. Air-fuel mixture in the combustion chambers 18 is burned by spark discharge of ignition plugs 24. This generates combustion energy, which is in turn converted into rotational energy of a crankshaft 26.

The air-fuel mixture burned in the combustion chambers 18 is discharged to an exhaust passage 30 as exhaust gas when exhaust valves 28 are opened. The exhaust passage 30 is provided with a three-way catalyst 32, which has an oxygen storage capacity, and a gasoline particulate filter 34 (hereinafter referred to as GPF 34). In the present embodiment, the GPF 34 supports a three-way catalyst that traps particulate matter (hereinafter referred to as PM).

The crankshaft 26 is mechanically coupled to a carrier C of a planetary gear mechanism 50, which is part of a power splitter. The planetary gear mechanism 50 includes a sun gear S, which is mechanically coupled to a rotary shaft 52a of the first motor-generator 52. The planetary gear mechanism 50 includes a ring gear R, which is mechanically coupled to a rotary shaft 54a of the second motor-generator 54 and to driven wheels 60. Alternating-current voltage of an inverter 56 is applied to terminals of the first motor-generator 52. Also, alternating-current voltage of an inverter 58 is applied to terminals of the second motor-generator 54. The inverters 56, 58 convert a terminal voltage Vb of a battery 59, which is a direct-current voltage source, into alternating-current voltage. In the present embodiment, the battery 59 is a rechargeable battery, such as a lithium-ion rechargeable battery.

<Configuration of Vehicle Control System>

As shown in FIG. 1, the vehicle control system includes an ENGECU 70, an MGECU 90, and an HEVECU 110. The ENGECU 70 is an engine controller, which is an engine control circuit. The MGECU 90 is a motor controller, which is a motor control circuit. The HEVECU 110 is a vehicle controller, which is a vehicle control circuit. That is, the vehicle control system includes a system control circuit, and the system control circuit includes the ENGECU 70, the MGECU 90, and the HEVECU 110.

The ENGECU 70 controls the engine 10 mounted on the vehicle. The ENGECU 70 operates operated units of the engine 10, such as the throttle valve 14, the direct injection valves 22, and the ignition plugs 24, thereby controlling torque and the ratios of exhaust components, which are controlled variables. FIG. 1 shows operation signals MS1 to MS3 respectively corresponding to the throttle valve 14, the, the direct injection valves 22, and the ignition plugs 24.

To control the controlled variables, the ENGECU 70 refers to an intake air amount Ga detected by an air flow meter 80, and an output signal Scr of a crank angle sensor 82. The ENGECU 70 also refers to a coolant temperature THW detected by a coolant temperature sensor 88.

The ENGECU 70 includes an ENGCPU 72 and a ROM 74. The ENGCPU 72, the ROM 74, and peripheral circuitry 76 can communicate with each other through a communication line 78. The peripheral circuitry 76 includes a circuit that generates a clock signal regulating internal operations, a power supply circuit, and a reset circuit. The ENGECU 70 controls controlled variables by causing the ENGCPU 72 to execute programs stored in the ROM 74.

The ENGECU 70 is also capable of communicating with the MGECU 90 and the HEVECU 110.

The MGECU 90 controls the first motor-generator 52. The MGECU 90 operates the inverter 56 in order to control the rotation speed, which is a controlled variable. The MGECU 90 also controls the second motor-generator 54. The MGECU 90 operates the inverter 58 in order to control the torque, which is a controlled variable. FIG. 1 shows operation signals MS4, MS5 respectively corresponding to the inverters 56, 58. The MGECU 90 refers to an output signal Sm1 from a first rotation angle sensor 100, which detects a rotation angle of the first motor-generator 52, in order to control a controlled variable of the first motor-generator 52. The MGECU 90 also refers to an output signal Sm2 from a second rotation angle sensor 102, which detects a rotation angle of the second motor-generator 54, in order to control a controlled variable of the second motor-generator 54.

The MGECU 90 includes an MGECPU 92 and a ROM 94. The MGECPU 92, the ROM 94, and peripheral circuitry 96 can communicate with each other through a communication line 98. The MGECU 90 controls controlled variables by causing the MGECPU 92 to execute programs stored in the ROM 94.

The HEVECU 110 controls the above-described hybrid system. The HEVECU 110 outputs command values related to the engine 10 to the ENGECU 70. The HEVECU 110 outputs command values related to the first motor-generator 52 and the second motor-generator 54 to the MGECU 90. In order to output command values, the HEVECU 110 refers to an accelerator operation amount ACCP, which is a depression amount of an accelerator pedal detected by an accelerator sensor 120. The HEVECU 110 refers to an output signal Sp from an output-side rotation angle sensor 122, which detects a rotation angle of the ring gear R. The HEVECU 110 refers to a charge-discharge current Ib of the battery 59 detected by a current sensor 124 and the terminal voltage Vb of the battery 59, which is detected by a voltage sensor 126. The HEVECU 110 includes an HEVCPU 112 and a ROM 114. The HEVCPU 112, the ROM 114, and peripheral circuitry 116 can communicate with each other through a communication line 118. The HEVECU 110 calculates command values by causing the HEVCPU 112 to execute programs stored in the ROM 114, and then outputs the calculated command values to the outside.

Hereinafter, among the processes executed by the vehicle control system, in particular, a regeneration process of the GPF 34, a command process by the HEVECU 110, and an operation process of the throttle valve 14 by the ENGECU 70 will be described in detail.

<Regeneration Process of GPF 34>

Figure 2:
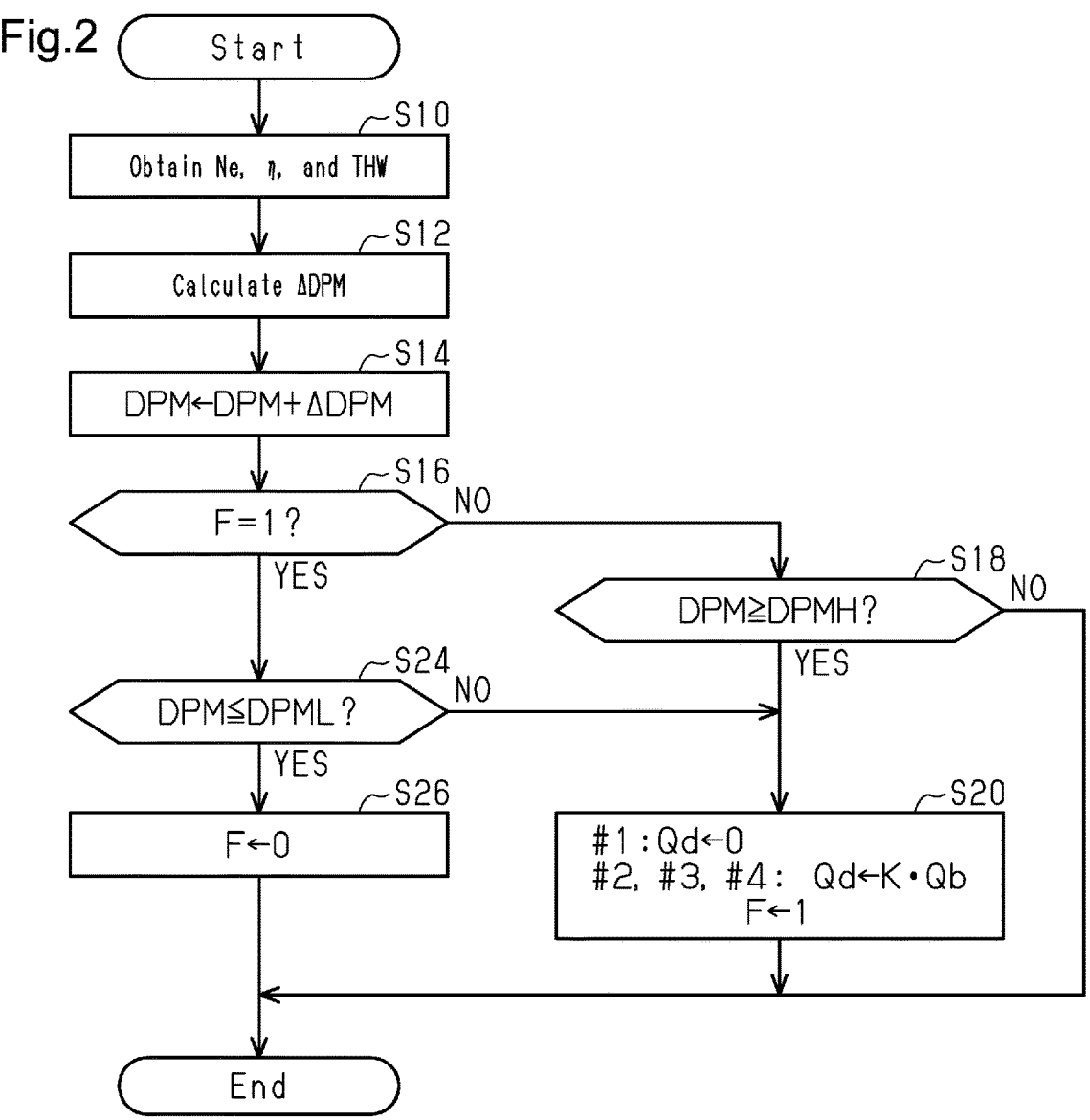
FIG. 2 is a flowchart of a series of processes related to a stopping process by the vehicle control system shown in FIG. 1.

FIG. 2 shows a procedure of the regeneration process. The processes shown in FIG. 2 are performed by the ENGCPU 72 repeatedly executing programs stored in the ROM 74 of the ENGECU 70 at predetermined time intervals. In the following description, the number of each step is represented by the letter S followed by a numeral.

In the series of processes shown in FIG. 2, the ENGCPU 72 first obtains an engine rotation speed Ne, a charging efficiency 11, and the coolant temperature THW (S10). Next, the ENGCPU 72 calculates an update amount ΔDPM of an accumulated amount DPM based on the engine rotation speed Ne, the charging efficiency η, and the coolant temperature THW (S12). The charging efficiency η is calculated by the ENGCPU 72 based on the intake air amount Ga and the engine rotation speed Ne. The accumulated amount DPM is the amount of PM trapped by the GPF 34. Specifically, the ENGCPU 72 calculates the amount of PM in the exhaust gas discharged to the exhaust passage 30 based on the engine rotation speed Ne, the charging efficiency η, and the coolant temperature THW. Also, the ENGCPU 72 calculates the temperature of the GPF 34 based on the engine rotation speed Ne and the charging efficiency η. Further, the ENGCPU 72 calculates the update amount ΔDPM based on the amount of PM in the exhaust gas and the temperature of the GPF 34. The temperature of the GPF 34 and the update amount ΔDPM may be calculated based on an increase factor K at the time of execution of the process of S20, which will be discussed below.

Next, the ENGCPU 72 updates the accumulated amount DPM by adding the update amount ΔDPM to the accumulated amount DPM (S14). Subsequently, the ENGCPU 72 determines whether a flag F has the value 1 (S16). The value 1 of the flag F indicates that a temperature increasing process for burning and removing the PM in the GPF 34 is being executed. The value 0 of the flag F indicates that the temperature increasing process is not being executed. When determining that the flag F has the value 0 (S16: NO), the ENGCPU 72 determines whether the accumulated amount DPM is greater than or equal to a regeneration execution value DPMH (S18). The regeneration execution value DPMH is a threshold used to determine that the PM amount trapped by the GPF 34 has increased based on the accumulated amount DPM being greater than or equal to the regeneration execution value DPMH.

When determining that the accumulated amount DPM is greater than or equal to the regeneration execution value DPMH (S18: YES), the ENGCPU 72 executes the temperature increasing process and assigns 1 to the flag F (S20). As the temperature increasing process according to the present embodiment, during a load operation of the engine 10, the ENGCPU 72 stops injection of fuel from the direct injection valve 22 of the cylinders #1, and sets the air-fuel ratio of the air-fuel mixture in the combustion chambers 18 of the cylinders #2, #3, and #4 to be richer than the stoichiometric air-fuel ratio. The first aspect of the temperature increasing process is a stopping process for increasing the temperature of the three-way catalyst 32. In this process, the four cylinders (#1 to #4) of the engine 10 include one stopping cylinder (#1) and three remaining cylinders (#2, #3, #4). The stopping process (S20) stops fuel supply to the stopping cylinder (#1) and supplies fuel to the remaining cylinders (#2, #3, #4) during a load operation of the engine 10. That is, the stopping process (S20) discharges oxygen and unburned fuel to the exhaust passage 30 to oxidize the unburned fuel in the three-way catalyst 32, thereby increasing the temperature of the three-way catalyst 32. The second aspect of the temperature increasing process is to increase the temperature of the GPF 34 and supply oxygen to the heated GPF 34, thereby removing the PM trapped by the GPF 34 through oxidation. That is, when the temperature of the three-way catalyst 32 is relatively high, high-temperature exhaust gas flows into the GPF 34, so that the temperature of the GPF 34 is increased. When, oxygen flows into the heated GPF 34, the PM trapped by the GPF 34 is removed through oxidation.

Specifically, the ENGCPU 72 assigns 0 to a requested injection amount Qd for the direct injection valve 22 of the cylinder #1 in the stopping process. In this case, the cylinder #1 is a stopping cylinder, to which fuel supply is stopped. On the other hand, in the stopping process, the ENGCPU 72 assigns a value obtained by multiplying a base injection amount Qb by the increase factor K to the requested injection amount Qd for the cylinders #2, #3, and #4. The base injection amount Qb is an amount of fuel that causes the air-fuel ratio of the air-fuel mixture in each combustion chamber 18 to be the stoichiometric air-fuel ratio.

The ENGCPU 72 sets the increase factor K such that the amount of unburned fuel in the exhaust gas discharged to the exhaust passage 30 from the cylinders #2, #3, and #4 is less than or equal to the amount that reacts with oxygen discharged from the cylinder #1 without excess or deficiency. Specifically, the ENGCPU 72 sets the increase factor K to a larger value when the temperature of the GPF 34 is relatively low than when the temperature of the GPF 34 is relatively high.

When determining that the accumulated amount DPM is less than the regeneration execution value DPMH (S18: NO), the ENGCPU 72 temporarily suspends the series of processes.

When determining that the flag F has the value 1 (S16: YES), the ENGCPU 72 determines whether the accumulated amount DPM is less than or equal to a stopping lower limit guard value DPML (S24). The stopping lower limit guard value DPML is a threshold that is used to determine that the amount of the PM trapped in the GPF 34 has become sufficiently small when the accumulated amount DPM is less than or equal to the stopping lower limit guard value DPML.

When determining that the accumulated amount DPM is larger than the stopping lower limit guard value DPML (S24: NO), the ENGCPU 72 advances the process to S20.

When the accumulated amount DPM is less than or equal to the stopping lower limit guard value DPML (S24: YES), the ENGCPU 72 stops the process of S20 and assigns 0 to the flag F (S26). When completing the processes of S20 and S26, the ENGCPU 72 temporarily suspends the series of processes shown in FIG. 2.

In this manner, the ENGECU 70 executes the regeneration process.

<Command Process by HEVECU 110>

In this vehicle control system, the HEVECU 110 calculates a requested engine rotation speed Ne* and a requested engine output Pe* and transmits them to the ENGECU 70. The ENGECU 70 controls the engine 10 in accordance with the received requested engine rotation speed Ne* and requested engine output Pe*.

Figure 3:
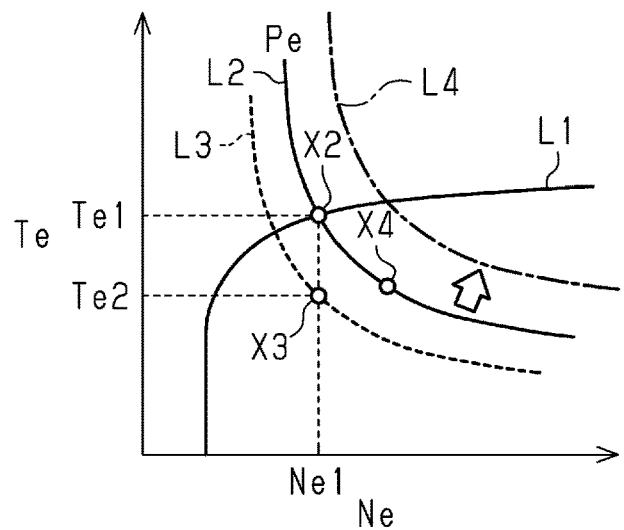
FIG. 3 is a graph for explaining a manner in which the vehicle control system shown in FIG. 1 calculates a requested engine torque and a requested engine rotation speed.

The ENGECU 70 calculates a requested engine torque Te* from the requested engine output Pe*. The solid line L1 shown in FIG. 3 is an optimal fuel efficiency line. The optimal fuel efficiency line is a line connecting operating points at which the fuel efficiency of the engine 10 is optimized. Each operating point on the solid line L1 shown in FIG. 3 is a point determined by a combination of the engine rotation speed Ne and an engine torque Te. The engine torque Te is a torque at the crankshaft 26, that is, a shaft torque.

The lines L2 to L4 shown in FIG. 3 are contour lines of an engine output Pe. At any operating point on each of the lines L2 to L4, the engine output Pe remains at a certain constant value. In the example shown in FIG. 3, the engine output Pe becomes higher toward the upper right region in FIG. 3. That is, the engine output Pe indicated by the long-dash short-dash line L4 is higher than the engine output Pe indicated by the solid line L2. Further, the engine output Pe indicated by the broken line L3 is lower than the engine output Pe indicated by the solid line L2.

The ENGECU 70 calculates the engine torque Te at an operating point corresponding to the intersection of the requested engine output Pe* and the optimal fuel efficiency line (L1). The engine torque Te is used as the requested engine torque Te*.

Figure 4:
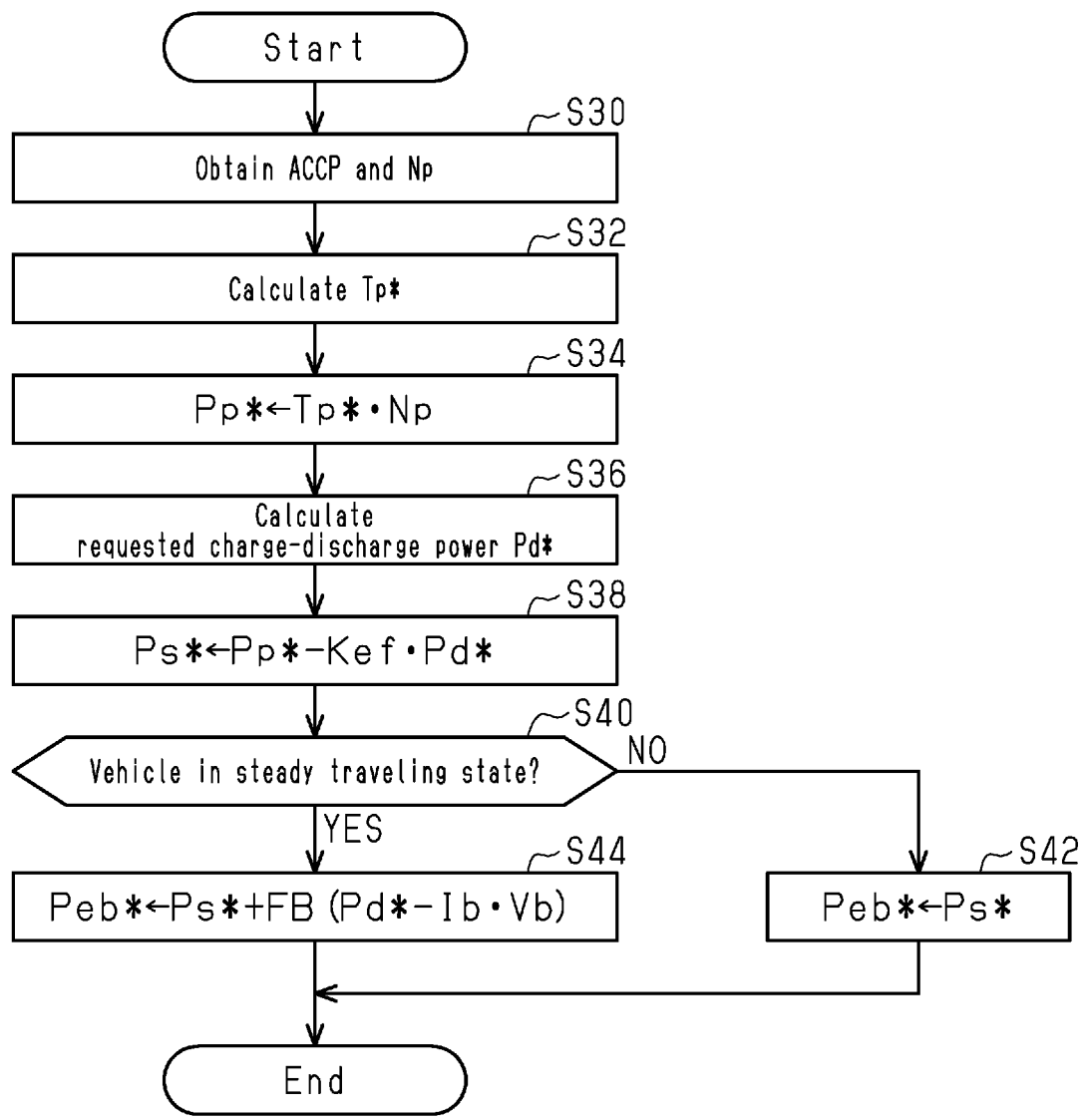
FIG. 4 is a flowchart of processes executed by a vehicle controller, i.e., a vehicle control circuit in the vehicle control system shown in FIG. 1.

FIG. 4 shows a procedure for calculating a requested engine output base value Peb* by the HEVECU 110. The requested engine output base value Peb* is a value for calculating the requested engine output Pe*. The processes shown in FIG. 4 are performed by the HEVCPU 112 repeatedly executing programs stored in the ROM 114 at predetermined time intervals.

In the series of processes shown in FIG. 4, the HEVCPU 112 first obtains the accelerator operation amount ACCP and the output-side rotation speed Np (S30). The output-side rotation speed Np is a rotation speed of the ring gear R. The output-side rotation speed Np is a variable indicating the vehicle speed. The output-side rotation speed Np is calculated by the HEVCPU 112 based on the output signal Sp.

Based on the accelerator operation amount ACCP and the output-side rotation speed Np, the HEVCPU 112 calculates a requested drive torque Tp*, which is a torque requested for the driven wheels 60 (S32). Next, the HEVCPU 112 assigns the product of the requested drive torque Tp* and the output-side rotation speed Np to a traveling output Pp* (S34). Subsequently, the HEVCPU 112 calculates a requested charge-discharge power Pd* of the battery 59 based on a state of charge SOC of the battery 59 (S36). The requested charge-discharge power Pd* is positive when discharging. Specifically, when the state of charge SOC is less than or equal to a specific value, the HEVCPU 112 sets the requested charge-discharge power Pd* to a negative value in order to charge the battery 59. The state of charge SOC is calculated by the HEVCPU 112 based on the charge-discharge current Ib and the terminal voltage Vb.

Next, the HEVCPU 112 assigns, to a system output Ps*, a value obtained by subtracting the product of the requested charge-discharge power Pd* and a conversion efficiency Kef from the traveling output Pp* (S38). Then, the HEVCPU 112 determines whether the vehicle is in a steady traveling state (S40). For example, the HEVCPU 112 determines that the vehicle is in a steady traveling state when the amount of change per unit time in the requested drive torque Tp* is less than or equal to a specified amount and the amount of change per unit time in the output-side rotation speed Np is less than or equal to a specified amount.

When determining that the vehicle is not in a steady traveling state (S40: NO), the HEVCPU 112 assigns the system output Ps* to the requested engine output base value Peb* (S42). When determining that the vehicle is in a steady traveling state (S40: YES), the HEVCPU 112 assigns a value obtained by adding a feedback correction amount FB to the system output Ps* to the requested engine output base value Peb* (S44). The feedback correction amount FB is an operation amount for performing feedback control in which the charge-discharge power of the battery 59 is fed back to the requested charge-discharge power Pd*. The actual charge-discharge power of the battery 59 is calculated by the HEVCPU 112 as the product of the charge-discharge current Ib and the terminal voltage Vb. When the value obtained by subtracting the actual charge-discharge power from the requested charge-discharge power Pd* is less than a lower limit value, the HEVCPU 112 corrects the feedback correction amount FB by increasing it by a specified amount. When the value obtained by subtracting the actual charge-discharge power from the requested charge-discharge power Pd* is larger than an upper limit value, the HEVCPU 112 corrects the feedback correction amount FB by reducing it by a specified amount.

When completing the processes of S42 and S44, the HEVCPU 112 temporarily suspends the series of processes shown in FIG. 4. In this manner, the HEVECU 110 calculates the requested engine output base value Peb*.

<Compensating Process>

When the stopping process (S20) is being executed, the supply of fuel to the stopping cylinders (#1) is stopped, and thus the output of the engine 10 may be insufficient.

Figure 5:
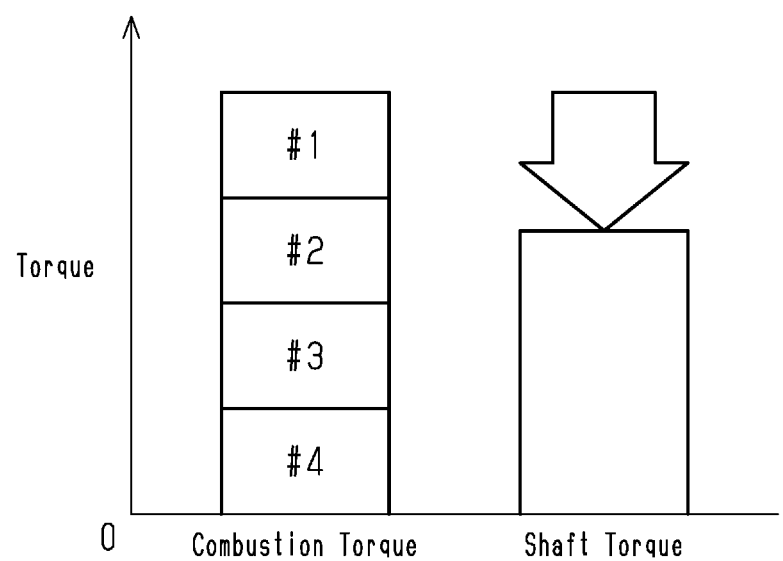
FIG. 5 is a graph for explaining a shaft torque when the stopping process shown in FIG. 2 is not being executed.

To be more specific, when the stopping process (S20) is not being executed, the sum of the torques generated by combustion in the four cylinders #1 to #4 is combustion torque of the engine 10 as shown in FIG. 5. The torque obtained by subtracting the loss torque due to the influence of pumping loss and friction loss from the combustion torque, as indicated by the outline arrow, is the shaft torque of the engine 10.

Figure 6:
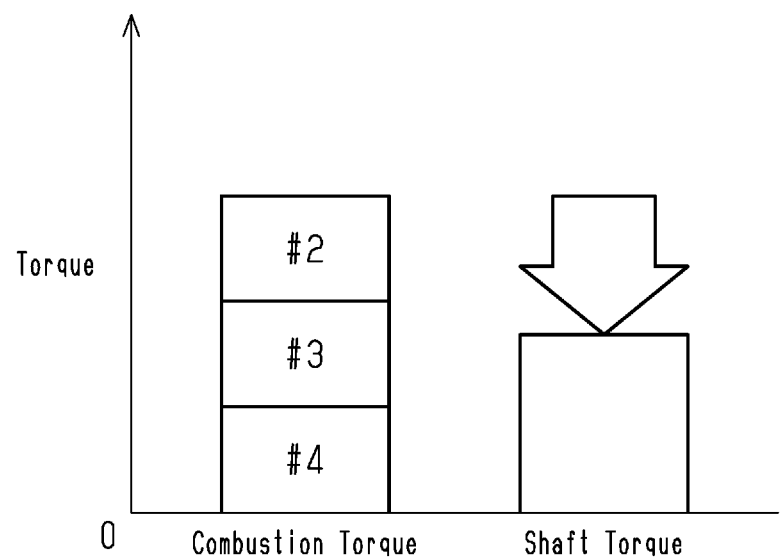
FIG. 6 is a graph for explaining the shaft torque when the stopping process shown in FIG. 2 is being executed.

In contrast, when the stopping process (S20) is being executed, combustion is not performed in the cylinder #1, so that the combustion torque is relatively small as shown in FIG. 6. The torque obtained by subtracting the loss torque due to the influence of pumping loss and friction loss from the combustion torque, as indicated by the outline arrow, is the shaft torque.

For example, as shown in FIG. 3, when the requested engine output Pe* is indicated by the solid line L2 and the stopping process (S20) is not being executed, the HEVECU 110 sets the requested engine rotation speed Ne* to Ne1, which is the engine rotation speed Ne at an operating point X2. Then, the ENGECU 70, which receives the requested engine rotation speed Ne* and the requested engine output Pe*, controls the engine 10. Thus, the engine 10 is controlled such that the engine rotation speed Ne becomes Ne1, and the engine torque Te becomes Te1.

When the stopping process (S20) is being executed, the engine torque Te is reduced by an amount corresponding to the presence of the stopping cylinder (#1). Therefore, even if the HEVECU 110 sets the requested engine rotation speed Ne* to Ne1, the engine torque Te becomes Te2, which is lower than Te1. As a result, the engine output Pe falls to the level indicated by a broken line L3. In this case, the vehicle control system may drive the second motor-generator 54 in order to compensate for the shortage of the engine output Pe. However, if the output shortage is compensated for by the second motor-generator 54 in this manner, the power consumption increases. This may reduce energy efficiency.

Therefore, in this vehicle control system, the compensating process is performed to compensate for the output shortage by combustion in the cylinders (#2 to #4) other than the stopping cylinder (#1). Specifically, the requested engine output Pe* is increased as indicated by the outline arrow in FIG. 3. For example, as shown in FIG. 3, the requested engine output Pe* is increased from the level indicated by the solid line L2 to the level indicated by the long-dash short-dash line L4. Thus, the engine 10 is controlled such that the operating point is located on the solid line L2 even when the stopping process is being executed, as indicated by an operating point X4 shown in FIG. 3. The operating point X4 is an intersection of the solid line L2 and a straight line drawn downward from the intersection of the optimal fuel efficiency line (L1) and the long-dash short-dash line L4. That is, when the stopping process is being executed, the operating point of the engine 10 is changed by multiplying the requested engine output base value Peb* by the correction factor Kpe to perform correction to increase the requested engine output Pe*. As a result, the output shortage is compensated for.

The degree of the influence of the pumping loss and the friction loss varies depending on the operating state of the engine 10. Thus, the magnitude of the correction factor Kpe required for compensation varies depending on the operating state of the engine 10 at the time.

Therefore, the vehicle control system adjusts the magnitude of the correction factor Kpe through the compensating process in accordance with the operating state of the engine 10.

<Process Related to Calculation of Correction Factor Kpe>

Next, a process for calculating the correction factor Kpe will be described with reference to FIG. 7. The processes shown in FIG. 7 are performed by the HEVCPU 112 executing programs stored in the ROM 114 of HEVECU 110 each time the requested engine output base value Peb* is updated.

Figure 7:
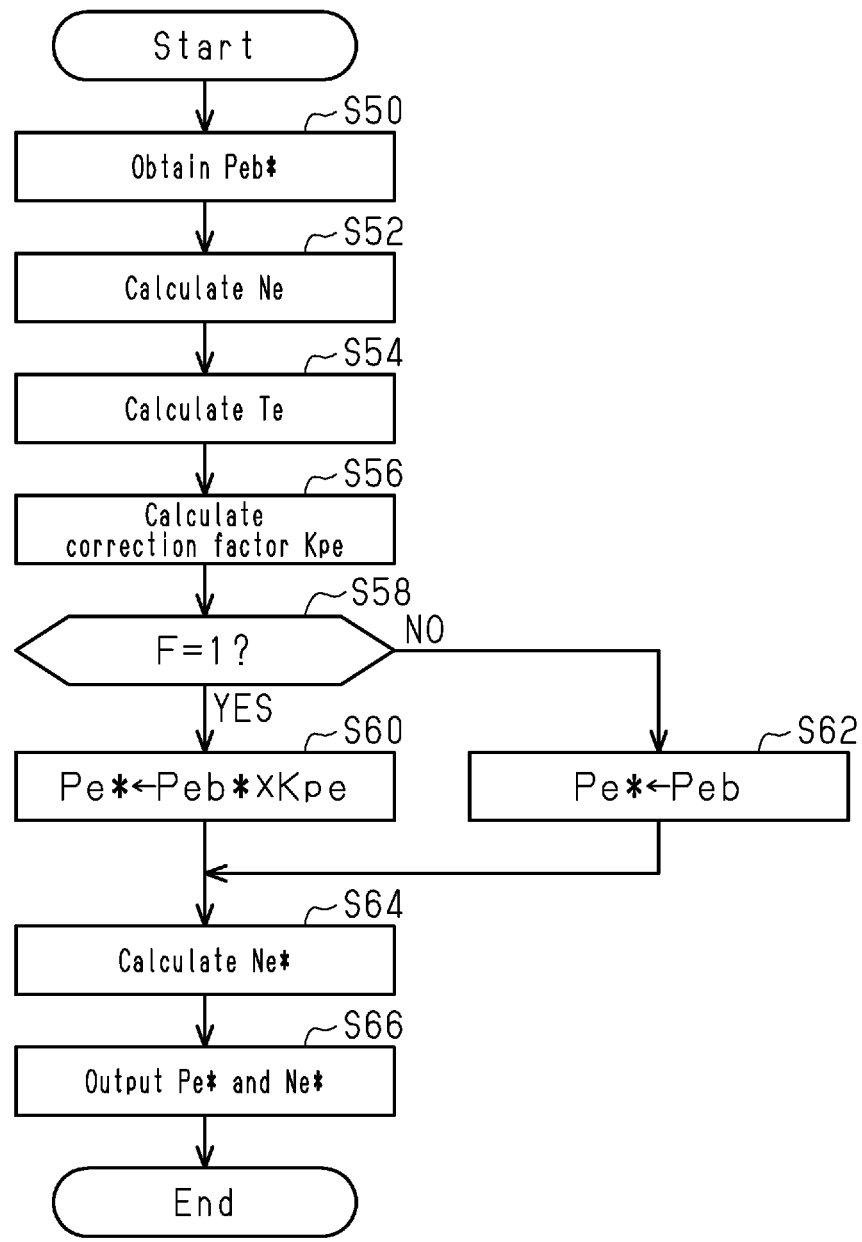
FIG. 7 is a flowchart of a series of processes related to a correction factor calculating process by the vehicle control system shown in FIG. 1.

In the series of processes shown in FIG. 7, the HEVCPU 112 first obtains the requested engine output base value Peb* (S50).

The HEVCPU 112 calculates the engine rotation speed Ne, which is used to calculate the correction factor Kpe, based on the requested engine output base value Peb* (S52). This is implemented by the HEVCPU 112 obtaining the engine rotation speed Ne through map calculation with map data stored in advance in the ROM 114. The map data has the requested engine output base value Peb* as an input variable, and the engine rotation speed Ne as an output variable. The map data refers to a data set of discrete values of an input variable and values of an output variable each corresponding to a value of the input variable. When the value of an input variable agrees with one of the values of the input variable on the map data, the map calculation uses the value of the corresponding output variable on the map data as the calculation result. When the value of an input variable does not agree with any of the values of the input variable on the map data, a value obtained by interpolation of multiple values of the output variable included in the map data is used as the calculation result.

Next, the HEVCPU 112 calculates the engine torque Te, which is used to calculate the correction factor Kpe (S54). The HEVCPU 112 calculates the engine torque Te, which is used to calculate of the correction factor Kpe, by performing division using the requested engine output base value Peb* as a dividend and the engine rotation speed Ne calculated through S52 as a divisor.

Then, the HEVCPU 112 calculates the correction factor Kpe based on the engine rotation speed Ne calculated through S52 and the engine torque Te calculated through S54 (S56). This calculation is implemented by map calculation of the correction factor Kpe in a state in which map data for calculating the correction factor Kpe is stored in advance in the ROM 114. The input variables of the map data for calculating the correction factor Kpe are the engine rotation speed Ne calculated through S52 and the engine torque Te calculated through S54. The output variable of the map data is the correction factor Kpe.

Figure 8:
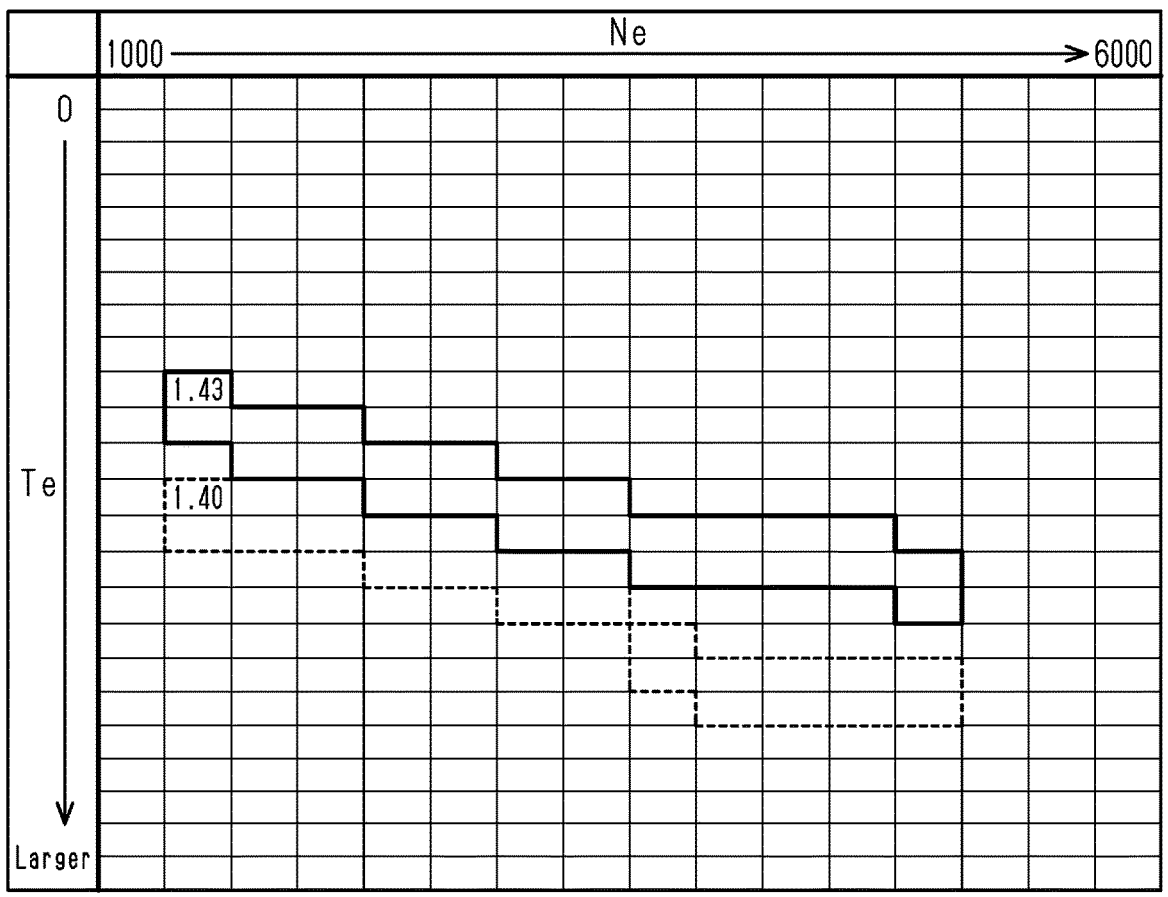
FIG. 8 is an explanatory diagram of map data for calculating the correction factor shown in FIG. 7.

FIG. 8 shows the map data. The correction factor Kpe calculated from the map data is a value greater than 1.0. The range surrounded by the solid line in FIG. 8 represents a range in which 1.43 is output as the correction factor Kpe. The range surrounded by the broken line in FIG. 8 represents a range in which 1.40 is output as the correction factor Kpe. In the map data, the correction factor Kpe decreases as the engine torque Te increases when the engine rotation speed Ne is the same. Also, in the map data, the correction factor Kpe increases as the engine rotation speed Ne increases when the engine torque Te is the same.

When completing the process of S56, the HEVCPU 112 determines whether the flag F has the value 1 (S58). When determining that the flag F has the value 0 (S58: NO), the HEVCPU 112 assigns the requested engine output base value Peb* to the requested engine output Pe* (S62).

When determining that the flag F has the value 1 (S58: YES), the HEVCPU 112 assigns Peb*×Kpe to the requested engine output Pe* (S60). That is, the HEVCPU 112 performs correction to increase the requested engine output Pe* by setting the requested engine output Pe* to the product of the requested engine power base value Peb* and the correction factor Kpe.

When completing the process of S60 or S62, the HEVCPU 112 calculates the requested engine rotation speed Ne* (S64). Specifically, the HEVCPU 112 calculates the requested engine rotation speed Ne* from the requested engine output Pe* as described with reference to FIG. 3. That is, the HEVCPU 112 sets the requested engine rotation speed Ne* to the engine rotation speed Ne at the operating point corresponding to the intersection of the requested engine output Pe* and the optimal fuel efficiency line (L1).

Next, the HEVCPU 112 outputs the requested engine output Pe* and the requested engine rotation speed Ne* to the ENGECU 70 (S66). When ending S66, the HEVCPU 112 temporarily suspends the series of processes illustrated in FIG. 7.

<Operation Process of Throttle Valve 14>

Figure 9:
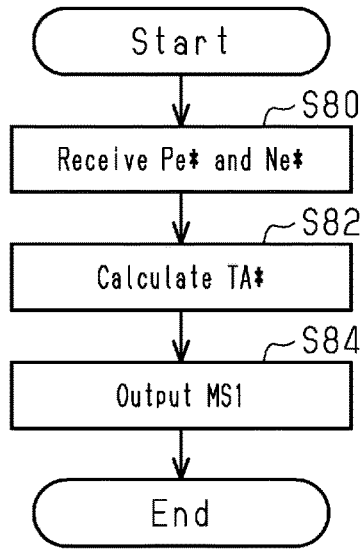
FIG. 9 is a flowchart of processes executed by an engine controller after the flow of FIG. 7.

FIG. 9 shows a procedure of processes related to operation of the throttle valve 14. The processes shown in FIG. 9 are performed by the ENGCPU 72 repeatedly executing programs stored in the ROM 74 of the ENGECU 70 at predetermined time intervals.

In the series of processes shown in FIG. 9, the ENGCPU 72 first receives the requested engine output Pe* and the requested engine rotation speed Ne* (S80). Then, the ENGCPU 72 calculates the requested engine torque Te* based on the requested engine output Pe* and the requested engine rotation speed Ne*. Then, the ENGCPU 72 calculates a throttle opening degree command value TA*, which is a command value for the opening degree of the throttle valve 14, based on the requested engine torque Te* and the requested engine rotation speed Ne* (S82). The throttle opening degree command value TA* calculated here is a value of the throttle opening degree for achieving the requested engine torque Te* and the requested engine rotation speed Ne* when the combustion control is executed in all of the cylinders #1 to #4. Then, the ENGCPU 72 outputs the operation signal MS1 to the throttle valve 14 to control the opening degree of the throttle valve 14 to the throttle opening degree command value TA* (S84). When completing the process of S84, the ENGCPU 72 temporarily suspends the series of processes illustrated in FIG. 9.

Operation of Present Embodiment

The HEVCPU 112 of the HEVECU 110 calculates the correction factor Kpe, which is used to increase the requested engine output Pe*, based on the engine rotation speed Ne and the engine torque Te through the processes of S50 to S56. That is, the processes of S50 to S56 correspond to a correction factor calculating process that calculates the correction factor Kpe, which is used to increase the requested engine output Pe*, based on the engine rotation speed Ne and the engine torque Te.

When the stopping process (S20) is being executed (S58: YES), the HEVCPU 112 of the HEVECU 110 sets the requested engine output Pe* to the product obtained by multiplying the requested engine power base value Peb* by the correction factor Kpe. Thus, the HEVCPU 112 performs correction to increase the requested engine output Pe*. Then, the HEVCPU 112 calculates the requested engine rotation speed Ne* based on the corrected requested engine output Pe*, and outputs the requested engine rotation speed Ne* to the ENGECU 70 (S64, S66).

The ENGECU 70, which has received the requested engine output Pe* and the requested engine rotation speed Ne*, calculates the requested engine torque Te* based on the received requested engine output Pe* and requested engine rotation speed Ne*. Then, the ENGECU 70 calculates the throttle opening degree command value TA* based on the calculated requested engine torque Te* and requested engine rotation speed Ne* (S82). Then, the ENGECU 70 controls the throttle valve 14 based on the throttle opening degree command value TA* (S84).

In this manner, when the stopping process (S20) is being executed, the vehicle control system compensates for the power reduction due to the execution of the stopping process (S20) by increasing the output generated by the combustions in the remaining cylinders (#2 to #4) through the processes of S60, S64, S66, S80, S82, and S84. That is, the processes of S60, S64, S66, S80, S82, and S84 correspond to a compensating process.

Advantages of Present Embodiment (1) When the engine rotation speed Ne is the same, the above-described vehicle control system causes the output after being increased by the compensating process to decrease as the engine torque Te increases. The magnitude of the output reduction due to the execution of the stopping process (S20), that is, the magnitude of the shortage of the engine output Pe that needs to be compensated for, varies depending on the engine rotation speed Ne and the engine Torque Te. When the engine rotation speed Ne is the same, shortage of the engine output Pe that needs to be compensated for decreases as the engine torque Te increases. In correspondence with such a tendency, the vehicle control system described above causes the engine output Pe after being increased by the compensating process to decrease as the engine torque Te increases. This allows the magnitude of the engine output Pe after being increased by the compensating process to be changed in accordance with changes in the magnitude of shortage of the engine output Pe that needs to be compensated for. This allows the output shortage to be compensated for appropriately.

(2) When the engine torque Te is the same, the vehicle control system described above causes the output after being increased by the compensating process to increase as the engine rotation speed Ne increases. When the engine rotation speed Ne is the same, the magnitude of the output shortage to be compensated for decreases as the shaft torque increases. In correspondence with such a tendency, the vehicle control system described above causes the engine output Pe after being increased by the compensating process to increase as the engine rotation speed Ne increases. This allows the magnitude of the engine output Pe after being increased by the compensating process to be changed in accordance with changes in the magnitude of shortage of the engine output Pe that needs to be compensated for. This allows the output shortage to be compensated for appropriately.

(3) In the compensating process, the HEVECU 110 increases the engine output Pe generated by the remaining cylinders (#2 to #4) by performing a correction to increase the requested engine output Pe* as compared to the requested engine output Pe* in a case in which the stopping process is not executed. This allows the engine output Pe after being increased by the compensating process to be controlled by adjusting the requested engine output Pe* calculated by the HEVECU 110.

(4) The HEVECU 110 calculates the engine rotation speed Ne used for calculation of the correction factor Kpe, separately from the requested engine rotation speed Ne* transmitted to the ENGECU 70. Then, the HEVECU 110 calculates the correction factor Kpe based on the engine rotation speed Ne and the engine torque Te in the correction factor calculating process (S50 to S56).

For example, when the correction factor Kpe is calculated based on the requested engine rotation speed Ne* transmitted to the ENGECU 70, the correction factor Kpe is calculated based on the requested engine rotation speed Ne*, which has been changed due to the influence of the correction of the requested engine output Pe*. This causes the requested engine output Pe* to continue to fluctuate. That is, robustness may be reduced.

In contrast, in the above-described vehicle control system, the HEVECU 110 calculates the engine rotation speed Ne, which is used to calculate the correction factor Kpe, separately from the requested engine rotation speed Ne*. This allows the correction factor Kpe to be calculated without being influenced by the correction of the requested engine output Pe*. In other words, robustness is improved.

<Modifications>

The above-described embodiment may be modified as follows. The above-described embodiment and the following modifications can be combined as long as the combined modifications remain technically consistent with each other.

The map data shown in FIG. 8 is created, based on the results of experiments performed in advance, by adjusting the magnitude of the correction factor Kpe such that reduction in output due to execution of the stopping process (S20) can be compensated for. However, even if the compensating process is executed, the engine output Pe may become excessive or deficient. In this regard, the vehicle control system may store a learning value that corresponds to the magnitude of excess or deficiency of the engine output Pe at the execution of the compensating process. The vehicle control system may correct the requested engine output Pe* in accordance with the magnitude of the stored learning value. This configuration further corrects the requested engine output Pe* in accordance with the magnitude of the learning value. This configuration thus compensates for shortage of the engine output Pe that cannot be compensated for by the compensating process, or prevents the engine output Pe from being excessive by the compensating process.

In the above-described embodiment, the correction factor Kpe is calculated based on the engine rotation speed Ne and the engine torque Te. However, the correction factor Kpe does not necessarily need to be changed in accordance with the engine rotation speed Ne. That is, the correction amount of the engine output Pe does not necessarily need to be changed in accordance with the engine rotation speed Ne. The correction factor Kpe may be calculated in accordance with only the engine torque Te.

Although a hybrid electric vehicle is used as an example in the above-described embodiment, the vehicle is not limited to a hybrid electric vehicle. For example, the vehicle control system may be used in a vehicle that includes only the engine 10 as the drive source. In this case, for example, the vehicle control system may include only the ENGECU 70. In this case, the ENGECU 70 may correct the requested engine output Pe*.

The number of cylinders for which combustion operation is to be stopped in the stopping process (S20) is not limited to one.

The GPF 34 is not limited to one provided on the downstream side of the three-way catalyst 32 in the exhaust passage 30. Further, the GPF 34 may be omitted. The GPF 34 is not limited to a filter supporting a three-way catalyst. For example, when a three-way catalyst is provided on the upstream side, the GPF 34 may include only a filter.

The vehicle control system is not limited to a system including multiple electronic control units capable of communicating with each other. For example, the vehicle control system may include a single electronic control unit.

The vehicle control system is not limited to one that includes the ENGCPU 72, the HEVCPU 112, and the ROMs 74, 114 and executes software processing. For example, at least part of the processes executed by the software in the above-described embodiment may be executed by hardware circuits dedicated to executing these processes (such as an application-specific integrated circuit (ASIC)). That is, the vehicle control system may be modified if it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. One or any desired number of software processing devices that each include a processor and a program storage device and one or any desired number of dedicated hardware circuits may be provided.

Instead of directly connecting the ring gear R and the second motor-generator 54, a reduction gear may be interposed therebetween.

The hybrid electric vehicle is not limited to a series-parallel hybrid electric vehicle. For example, the hybrid electric vehicle may be a parallel hybrid electric vehicle. Even in this case, when the regeneration process or the like is executed, it is not always possible to compensate for decrease in the engine output Pe by a motor-generator, depending on the state of charge SOC of the battery 59 or the like. Therefore, it is effective to increase the output of the engine 10 in the manner described in the above-described embodiment.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle control system, comprising a system control circuit, the system control circuit being configured to execute:
   a stopping process for an engine mounted on a vehicle, the engine including cylinders that include one or more stopping cylinders and one or more remaining cylinders, and the stopping process stopping fuel supply to the one or more stopping cylinders while supplying fuel to the one or more remaining cylinders during a load operation of the engine, wherein during execution of the stopping process, opening and closing operations of intake valves and exhaust valves for the one or more stopping cylinders continue; and
   a compensating process that, during execution of the stopping process, compensates for a decrease in output of the one or more stopping cylinders due to the execution of the stopping process by increasing output generated by combustion in the one or more remaining cylinders,
   wherein the system control circuit is configured to cause, when the engine rotation speed remains unchanged, the output of the one or more remaining cylinders after being increased by the compensating process to decrease as a shaft torque of a crankshaft of the engine increases.

2. The vehicle control system according to claim 1, wherein the system control circuit is configured to cause, when the shaft torque remains unchanged, the output of the one or more remaining cylinders after being increased by the compensating process to increase as an engine rotation speed increases.

3. The vehicle control system according to claim 1, wherein
   the vehicle is a hybrid electric vehicle equipped with the engine and a motor as drive sources,
   the system control circuit includes:
     an engine control circuit configured to control the engine; and
     a vehicle control circuit that calculates a requested engine rotation speed and a requested engine output, the vehicle control circuit transmitting the requested engine rotation speed and the requested engine output to the engine control circuit,
   the engine control circuit is configured to control the engine in accordance with the requested engine rotation speed and the requested engine output from the vehicle control circuit, and in the compensating process, the vehicle control circuit is configured to increase the output generated by the one or more remaining cylinders by performing a correction to increase the requested engine output as compared to the requested engine output in a case in which the stopping process is not executed.

4. The vehicle control system according to claim 3, wherein the vehicle control circuit is configured to execute a correction factor calculating process that calculates a correction factor for increasing the requested engine output based on the engine rotation speed and the shaft torque, and the vehicle control circuit is configured to calculate the engine rotation speed used for calculation of the correction factor, separately from the requested engine rotation speed transmitted to the engine control circuit.

5. The vehicle control system according to claim 4, wherein the system control circuit is configured to store a learning value corresponding to a magnitude of excess or deficiency of the output generated by the one or more remaining cylinders when the compensating process is executed; and correct the requested engine output in accordance with a magnitude of the stored learning value.

6. A vehicle control method performed by a system control circuit, the vehicle control method comprising:

executing a stopping process for an engine mounted on a vehicle, the engine including cylinders that include one or more stopping cylinders and one or more remaining cylinders, and the stopping process stopping fuel supply to the one or more stopping cylinders while supplying fuel to the one or more remaining cylinders during a load operation of the engine, wherein during execution of the stopping process, opening and closing operations of intake valves and exhaust valves for the one or more stopping cylinders continue;

executing a compensating process that, during execution of the stopping process, compensates for a decrease in output of the one or more stopping cylinders due to the execution of the stopping process by increasing output generated by combustion in the one or more remaining cylinders; and causing, when an engine rotation speed remains unchanged, the output of the one or more remaining cylinders after being increased by the compensating process to decrease as a shaft torque of a crankshaft of the engine increases.

7. A non-transitory computer readable medium that stores a program that causes a processor to execute a vehicle control process, the vehicle control process including:

executing a stopping process for an engine mounted on a vehicle, the engine including cylinders that include one or more stopping cylinders and one or more remaining cylinders, and the stopping process stopping fuel supply to the one or more stopping cylinders while supplying fuel to the one or more remaining cylinders during a load operation of the engine, wherein during execution of the stopping process, opening and closing operations of intake valves and exhaust valves for the one or more stopping cylinders continue;

executing a compensating process that, during execution of the stopping process, compensates for a decrease in output of the one or more stopping cylinders due to the execution of the stopping process by increasing output generated by combustion in the one or more remaining cylinders; and causing, when an engine rotation speed of the engine remains unchanged, the output of the one or more remaining cylinders after being increased by the compensating process to decrease as a shaft torque of a crankshaft of the engine increases.

* * * * *